(12) United States Patent
Hong

(10) Patent No.: US 11,765,551 B2
(45) Date of Patent: Sep. 19, 2023

(54) INFORMATION TRANSMISSION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 324 days.

(21) Appl. No.: 17/272,653

(22) PCT Filed: Sep. 4, 2018

(86) PCT No.: PCT/CN2018/103961
§ 371 (c)(1),
(2) Date: Mar. 2, 2021

(87) PCT Pub. No.: WO2020/047737
PCT Pub. Date: Mar. 12, 2020

(65) Prior Publication Data
US 2021/0345066 A1    Nov. 4, 2021

(51) Int. Cl.
H04W 76/19 (2018.01)
H04W 4/029 (2018.01)
G08G 5/00 (2006.01)
H04W 84/06 (2009.01)

(52) U.S. Cl.
CPC ......... *H04W 4/029* (2018.02); *H04W 76/19* (2018.02); *G08G 5/0013* (2013.01); *H04W 84/06* (2013.01)

(58) Field of Classification Search
CPC ....... H04W 4/029; H04W 4/40; H04W 36/12; H04W 36/32; H04W 36/08; H04W 36/38; H04W 76/19; H04W 76/27; H04W 84/02; H04W 84/06
See application file for complete search history.

(56) References Cited

U.S. PATENT DOCUMENTS

| 4,577,194 A  * | 3/1986 | Ragsdale | G01S 1/50 701/467 |
| 9,858,824 B1 | 1/2018 | Zogg | |
| 10,140,875 B1 * | 11/2018 | Luo | G06N 3/126 |
| 2014/0231590 A1 * | 8/2014 | Trowbridge | G08G 5/0039 244/175 |
| 2016/0273921 A1 * | 9/2016 | Zhou | G01C 21/165 |
| 2016/0300492 A1 * | 10/2016 | Pasko | G08G 5/0013 |

(Continued)

OTHER PUBLICATIONS

OA for IN Application No. 202147012849, mailed on Feb. 3, 2022.
(Continued)

*Primary Examiner* — Jean A Gelin
(74) *Attorney, Agent, or Firm* — SYNCODA LLC; Feng Ma

(57) ABSTRACT

An information transmission method includes: when determining that a UAV has flight path information, the base station configures a first flight path point number for the UAV. The first flight path point number is configured to represent a first upper limit of flight path points that the base station allows the UAV to report. The base station sends the first flight path point number to the UAV. The UAV determines first path points information that needs to be reported in the flight path information according to the first flight path point number, and sends the first path points information to the base station.

20 Claims, 10 Drawing Sheets

--- when determining that the UAV has flight path information, configuring a first flight path point number for the UAV, wherein the first flight path point number is used to represent a first upper limit of flight path points that the base station allows the UAV to report — 110 sending the first flight path point number to the UAV, so that the UAV determines first path points information that needs to be reported in the flight path information — 120 receiving the first path points information sent by the UAV — 130

(56) References Cited

U.S. PATENT DOCUMENTS

2019/0306675 A1* 10/2019 Xue ..................... H04B 17/345
2020/0023968 A1* 1/2020 Wu .................... B64D 45/0015

OTHER PUBLICATIONS

Search Report for EP Application No. 18932648.1, dated Mar. 18, 2022.
Ericsson: Introduction of Release-15 Aerial functionality, 3GPP TSG-WG2 Meeting #103, Gothenburg, Sweden, Aug. 20-24, 2018, R2-1813412.
LG Electronics Inc. "Zone Based Flight Path Reporting" 3GPP TSG-RAN WG2 Meeting #103 R2-1812581; Aug. 24, 2018; No. 5.6.5; section 6.3.6.
ISR of PCT application No. PCT/CN2018/103961 mailed Jun. 11, 2019.

* cited by examiner

INFORMATION TRANSMISSION METHOD AND APPARATUS

CROSS-REFERENCE TO RELATED APPLICATIONS

This application is a national stage of International Application No. PCT/CN2018/103961 filed on Sep. 4, 2018, the disclosure of which is hereby incorporated by reference in its entirety.

TECHNICAL FIELD

The present disclosure relates to a field of communication technology, and particularly to a method and an apparatus for information transmission.

BACKGROUND

Unmanned Aerial Vehicle, UAV, is an unmanned aircraft operated by radio remote control equipment and self-prepared program control apparatus.

With the constant development of UAV technology, UAV has been widely used. In related technologies, in order to further expand the application of UAV, a cellular network is required to provide services meeting requirements. However, the existing cellular network hasn't provided technical solutions for obtaining flight path information of UAV, which reduces a service quality provided by cellular network for UAV.

SUMMARY

A method and an apparatus for information transmission are provided by embodiments of the present disclosure to overcome the problems existing in the relevant technologies.

According to a first aspect of embodiments of the present disclosure, a method for information transmission is provided. The method is applied to a base station, and includes:

when determining that a UAV has flight path information, configuring a first flight path point number for the UAV, wherein the first flight path point number is used to represent a first upper limit of the number of flight path points that the base station allows the UAV to report;

sending the first flight path point number to the UAV, so that the UAV determines first path points information that needs to be reported in the flight path information according to the first flight path point number;

receiving the first path points information sent by the UAV.

Optionally, the method further includes:

receiving first indication information sent by the UAV, wherein the first indication information is used to indicate that the UAV has the flight path information;

determining that the UAV has the flight path information according to the first indication information.

Optionally, receiving the path indication information sent by the UAV includes:

receiving a first radio resource control (RRC) signaling sent by the UAV, wherein the first RRC signaling includes the path indication information;

obtaining the path indication information from the first RRC signaling.

Optionally, the first RRC signaling includes at least one of:

RRCConnectionReconfigurationComplete signaling;
RRCConnectionReestablishmentComplete signaling;
RRCConnectionResumeComplete signaling; and
RRCConnectionSetupComplete signaling.

Optionally, configuring the first flight path point number for the UAV includes:

determining the first flight path point number according to a memory size of the base station.

Optionally, sending the first flight path point number to the UAV includes:

adding the first flight path point number to a second RRC signaling;

sending the second RRC signaling to the UAV, so that the UAV obtains the first flight path point number from the second RRC signaling.

Optionally, the second RRC signaling includes UEInformationRequest signaling, and the UE Information Request signaling includes a FlightPathInformationReq unit for bearing the first flight path point number.

Optionally, receiving the first path points information sent by the UAV includes:

receiving a third RRC signaling sent by UAV, wherein the third RRC signaling comprises the first path points information;

obtaining the first path points information from the third RRC signaling.

Optionally, the third RRC signaling includes UEInformationResponse signaling, and the UEInformationResponse signaling includes a FlightPathInformationReport unit for bearing the first flight path points information.

Optionally, the method further includes:

when the third RRC signaling further comprises second indication information used to indicate a number of remaining path points unreported in the UAV, configuring a second flight path point number for the UAV according to the number of remaining path points, wherein the second flight path point number is used to represent a second upper limit of the number of flight path points that the base station allows the UAV to report again;

sending the second flight path point number to the UAV, so that the UAV determines second path points information corresponding to the second flight path point number from unreported flight path information;

receiving the second path points information sent by the UAV.

According to a second aspect of embodiments of the present disclosure, a method for information transmission is provided. The method is applied to a UAV having flight path information, and includes:

receiving a first flight path point number sent by a base station, wherein the first flight path point number is used to represent a first upper limit of the number of flight path points that the base station allows the UAV to report;

determining first path points information that needs to be reported in the flight path information according to the first flight path point number;

sending the first path points information to the base station.

Optionally, the method further includes:

generating first indication information, wherein the first indication information is used to indicate that the UAV has the flight path information;

sending the first indication information to the base station, so that the base station determines that the UAV has the flight path information according to the first indication information.

Optionally, sending the first indication information to the base station includes:

adding the first indication information to a first radio resource control (RRC) signaling;

sending the first RRC signaling to the base station, so that the base station obtains the first indication information from the first RRC signaling.

Optionally, the first RRC signaling includes at least one of:

RRCConnectionReconfigurationComplete signaling;
RRCConnectionReestablishmentComplete signaling;
RRCConnectionResumeComplete signaling; and
RRCConnectionSetupComplete signaling.

Optionally, receiving the first flight path point number sent by the UAV includes:

receiving a second RRC signaling sent by the base station, wherein the second RRC signaling comprises the first flight path point number;

obtaining the first flight path point number from the second RRC signaling.

Optionally, the second RRC signaling includes UEInformationRequest signaling, and the UEInformationRequest signaling includes a FlightPathInformationReq unit for bearing the first flight path point number.

Optionally, the flight path information includes information corresponding to a first number of flight path points;

determining the first path points information that needs to be reported in the flight path information according to the first flight path point number includes:

if the first number is less than or equal to the first flight path point number, determining the path points information corresponding to the first number of flight path points as the first path points information;

sending the first path points information to the base station includes:

adding the first path points information to a third RRC signaling;

sending the third RRC signaling to the base station, so that the base station obtains the first path points information from the third RRC signaling.

Optionally, the flight path information includes path points information corresponding to a first number of flight path points;

determining the first path points information corresponding to the first flight path point number from the flight path information includes:

if the first number is greater than the first flight path point number, selecting path points information corresponding to the first flight path point number from path points information corresponding to the first number of flight path points and determining selected paths point information as the first path points information;

sending the first path points information to the base station includes:

generating second indication information, wherein the second indication information is used to indicate a number of remaining path points unreported in the UAV;

adding the first path points information and the second indication information to a third RRC signaling;

sending the third RRC signaling to the base station, so that the base station obtains the first path points information and the second indication information from the third RRC signaling.

Optionally, the third RRC signaling includes UEInformationResponse signaling, and the UEInformationResponse signaling includes a FlightPathInformationReport unit for bearing the first flight path points information.

Optionally, the method further includes:

receiving a second flight path point number sent by the base station, wherein the second flight path point number is used to represent a second upper limit of the number of flight path points that the base station allows the UAV to report again;

determining second path points information that needs to be reported from unreported flight path information according to the second flight path point number; and sending the second path points information to the base station.

According to a third aspect of embodiments of the present disclosure, an apparatus for information transmission is provided. The apparatus is applied to a base station and includes:

a first configuring module, configured to, when determining a UAV has flight path information, configure a first flight path point number for the UAV, wherein the first flight path point number is used to represent a first upper limit of the number of flight path points that the base station allows the UAV to report;

a first sending module, configured to send the first flight path point number to the UAV, so that the UAV determines first path points information that needs to be reported in the flight path information according to the first flight path point number;

a first receiving module, configured to receive the first path points information sent by the UAV.

Optionally, the apparatus further includes:

a second receiving module, configured to receive first indication information sent by the UAV, wherein the first indication information is used to indicate that the UAV has the flight path information;

a determining module, configured to determine that the UAV has the flight path information according to the first indication information.

Optionally, the second receiving module includes:

a first receiving submodule, configured to receive a first radio resource control RRC signaling sent by the UAV, wherein the first RRC signaling comprises the path indication information;

a first obtaining submodule, configured to obtain the path indication information from the first RRC signaling.

Optionally, the first RRC signaling includes at least one of:

RRCConnectionReconfigurationComplete signaling;
RRCConnectionReestablishmentComplete signaling;
RRCConnectionResumeComplete signaling; and
RRCConnectionSetupComplete signaling.

Optionally, the first configuring module includes:

a configuring submodule, configured to determine the first flight path point number according to a memory size of the base station.

Optionally, the first sending module includes:

an adding submodule, configured to add the first flight path point number to a second RRC signaling;

a sending submodule, configured to send the second RRC signaling to the UAV, so that the UAV obtains the first flight path point number from the second RRC signaling.

Optionally, the second RRC signaling includes UEInformationRequest signaling, and the UEInformationRequest signaling includes a FlightPathInformationReq unit for bearing the first flight path point number.

Optionally, the first receiving module includes:

a second receiving submodule, configured to receive a third RRC signaling sent by UAV, wherein the third RRC signaling comprises the first path points information;

a second obtaining submodule, configured to obtain the first path points information from the third RRC signaling.

Optionally, the third RRC signaling includes UEInformationResponse signaling, and the UEInformationResponse signaling includes a FlightPathInformationReport unit for bearing the first path points information.

Optionally, the apparatus further includes:

a second configuring module, configured to, when the third RRC signaling further comprises second indication information used to indicate a number of remaining path points unreported in the UAV, configuring a second flight path point number for the UAV according to the number of remaining path points, wherein the second flight path point number is used to represent a second upper limit of the number of flight path points that the base station allows the UAV to report again;

a third sending module, configured to send the second flight path point number to the UAV, so that the UAV determines second path points information corresponding to the second flight path point number from unreported flight path information;

a second receiving module, configured to receive the second path points information sent by the UAV.

According to a fourth aspect of embodiments of the present disclosure, an apparatus for information transmission is provided. The apparatus is applied to a UAV having flight path information, and includes:

a first path point number receiving module, configured to receive a first flight path point number sent by the base station, wherein the first flight path point number is used to represent a first upper limit of the number of flight path points that the base station allows the UAV to report;

a first information determining module, configured to determine first path points information that needs to be reported in the flight path information according to the first flight path point number;

a first information sending module, configured to send the first path points information to the base station.

Optionally, the apparatus further includes:

an information generating module, configured to generate first indication information, wherein the first indication information is used to indicate that the UAV has the flight path information;

a second information sending module, configured to send the first indication information to the base station, so that the base station determines that the UAV has the flight path information according to the first indication information.

Optionally, the second information sending module includes:

a first information adding submodule, configured to add the first indication information to a first radio resource control RRC signaling;

a first signaling sending submodule, configured to send the first RRC signaling to the base station, so that the base station obtains the first indication information from the first RRC signaling.

Optionally, the first RRC signaling includes at least one of:

RRCConnectionReconfigurationComplete signaling;

RRCConnectionReestablishmentComplete signaling;

RRCConnectionResumeComplete signaling; and

RRCConnectionSetupComplete signaling.

Optionally, the first path point number receiving module includes:

a signaling receiving submodule, configured to receive a second RRC signaling sent by the base station, wherein the second RRC signaling comprises the first flight path point number;

a path point number obtaining submodule, configured to obtain the first flight path point number from the second RRC signaling.

Optionally, the second RRC signaling includes UEInformationRequest signaling, and the UEInformationRequest signaling includes a FlightPathInformationReq unit for bearing the first flight path point number.

Optionally, the flight path information includes information corresponding to a first number of flight path points;

the first information determining module includes:

a first determining submodule, configured to, if the first number is less than or equal to the first flight path point number, determining path points information corresponding to the first number of flight path points as the first path points information;

the first information sending module includes:

a second information adding submodule, configured to add the first path points information to a third RRC signaling;

a second signaling sending submodule, configured to send the third RRC signaling to the base station, so that the base station obtains the first path points information from the third RRC signaling.

Optionally, the flight path information includes information corresponding to a first number of flight path points;

the first information determining module includes:

a second determining submodule, configured to, if the first number is greater than the first flight path point number, selecting path points information corresponding to the first flight path point number from the path points information corresponding to the first number of flight path points and determine selected path points information as the first path points information;

the first information sending module includes:

an information generating submodule, configured to generate second indication information, wherein the second indication information is used to indicate a number of remaining path points unreported in the UAV;

a third information adding submodule, configured to add the first path points information and the second indication information to a third RRC signaling;

a third signaling sending submodule, configured to send the third RRC signaling to the base station, so that the base station obtains the first path points information and the second indication information from the third RRC signaling.

Optionally, the third RRC signaling includes UEInformationResponse signaling, and the UEInformationResponse signaling includes a FlightPathInformationReport unit for bearing the first path points information.

Optionally, the apparatus further includes:

a second path point number receiving module, configured to receive a second flight path point number sent by the base station, wherein the second flight path point number is used to represent a second upper limit of the number of flight path points that the base station allows the UAV to report again;

a second information determining module, configured to determine second path points information that needs to be reported from unreported flight path information according to the second flight path point number;

a third information sending module, configured to send the second path points information to the base station.

According to a fifth aspect of embodiments of the present disclosure, a non-temporary computer readable storage medium stored thereon with a computer program is provided. The computer program is configured to implement the method for information transmission described above in the first aspect.

According to a sixth aspect of embodiments of the present disclosure, a non-temporary computer readable storage medium stored thereon with a computer program is provided. The computer program is configured to implement the method for information transmission described above in the second aspect.

According to a seventh aspect of embodiments of the present disclosure, an apparatus for information transmission is provided. The apparatus is applied to a base station, and includes:

a processor;

a memory configured to store instructions executable by the processor;

wherein, the processor is configured to:

when determining that a UAV has flight path information, configure a first flight path point number for the UAV, wherein the first flight path point number is used to represent a first upper limit of the number of flight path points that the base station allows the UAV to report;

send the first flight path point number to the UAV, so that the UAV determines the first path points information corresponding to the first flight path point number from the flight path information;

receive the first path points information sent by the UAV.

According to an eighth aspect of embodiments of the present disclosure, an apparatus for information transmission is provided. The apparatus is applied to a UAV having flight path information, and includes:

a processor;

a memory configured to store instructions executable by the processor;

wherein, the processor is configured to:

receive a first flight path point number sent by a base station, wherein the first flight path point number is used to represent a first upper limit of the number of flight path points that the base station allows the UAV to report;

determine first path points information corresponding to the first flight path point number from the flight path information;

send the first path points information to the base station.

The technical solutions provided by embodiments of the present disclosure may include the following beneficial effect.

In the present disclosure, when determining that the UAV has flight path information, the base station may configure the first flight path point number for the UAV, the first flight path point number being used to represent the first upper limit of the number of flight path points that the base station allows the UAV to report, and may send the first flight path point number to the UAV, so that the UAV determines the first path points information that needs to be reported in the flight path information, and sends the first path points information to the base station, thus achieving reporting the path points information according to the configuration of the base station, improving the efficiency of reporting path points information by the UAV and saving resource consumption of information transmission.

In the present disclosure, when receiving the first flight path point number sent by the base station, the first flight path point number being used to represent the first upper limit of the number of flight path points that the base station allows the UAV to report, the UAV may determine the first path points information that need to be reported in the flight path information according to the first flight path point number and send the first path points information to the base station, thus achieving reporting the path points information according to the configuration of the base station, improving the efficiency of reporting path points information by the UAV and saving resource consumption of information transmission.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms described in this disclosure are only for the purpose of describing specific embodiments and are not intended to restrict this disclosure. The singular forms "a", "the" and "said" used in this disclosure and appended claim are also intended to include plural forms, unless the context clearly indicates otherwise. It should also be understood that the term "and/or" used in this disclosure means and includes any or all possible combinations of one or more associated listed items.

It should be understood that, although the terms first, second, third, etc. in this disclosure may be used to describe all kinds of information, such information shall not be limited to these terms. These terms are only used to distinguish the same type of information. For example, without departing from the scope of the present disclosure, indication information may also be referred to as second information, and similarly, second information may also be referred to as indication information. Depending on the context, the word "if" as used herein can be interpreted as "in a case that" or "when" or "in response to determining".

Figure 1:
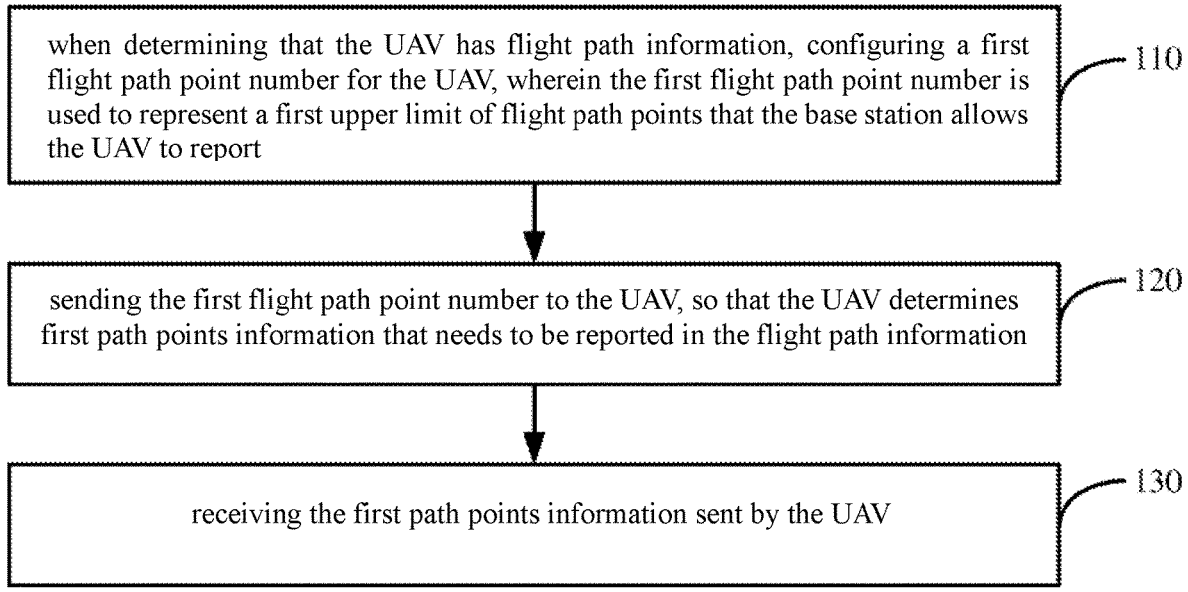
FIG. 1 is a flowchart illustrating a method for information transmission according to an example embodiment.
Figure 2:
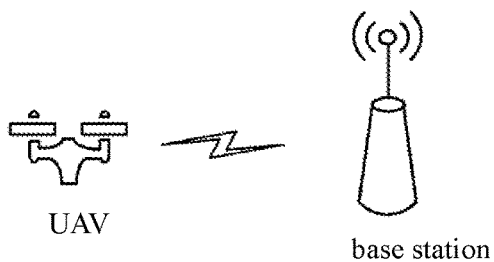
FIG. 2 is a schematic diagram illustrating an application scenario of a method for information transmission according to an example embodiment.

FIG. 1 is a flowchart illustrating a method for information transmission according to an example embodiment, and FIG. 2 is a schematic diagram illustrating an application scenario of a method for information transmission according to an example embodiment. This method for information transmission may be applied to a base station. As illustrated in FIG. 1, the method for information transmission may include the following blocks 110-130:

At block 110, when determining that a UAV has flight path information, a first flight path point number is configured for the UAV. The first flight path point number is used to represent a first upper limit of the number of flight path points that the base station allows the UAV to report.

In embodiments of the present disclosure, the first upper limit may refer to a maximum number of flight path points that the base station allows the UAV to report. As the base station is unaware of the number of flight path points included in the flight path information of the UAV, the value of the first flight path point number may be configured by the base station according to the actual situation. For example, the first flight path point number is 15.

In an embodiment, when configuring the first flight path point number for the UAV at block 110, the first flight path point number may be determined according to a memory size of the base station.

In an embodiment, when determining that the UAV has flight path information at block 110, it may be determined according to first indication information sent by UAV, the detailed implementation of which includes:

(1-1) receiving the first indication information sent by the UAV, wherein the first indication information is used to indicate that the UAV has flight path information;

(1-2) determining that the UAV has the flight path information according to the first indication information.

In an embodiment, action (1-1) may be implemented by a first RRC (Radio Resource Control) signaling, the detailed implementation of which includes:

(2-1) receiving the first RRC signaling sent by the UAV, wherein the first RRC signaling includes the path indication information;

(2-2) obtaining the path indication information from the first RRC signaling.

In an embodiment, the first RRC signaling includes, but not limited to, at least one of:

RRCConnectionReconfigurationComplete signaling;
RRCConnectionReestablishmentComplete signaling;
RRCConnectionResumeComplete signaling; and
RRCConnectionSetupComplete signaling.

At block 120, the first flight path point number is sent to the UAV, so that the UAV determines the first path points information that needs to be reported in the flight path information according to the first flight path point number.

In an embodiment, block 120 may be implemented by a second RRC signaling, the detailed implementation of which includes:

(3-1) adding the first flight path point number to the second RRC signaling;

(3-2) sending the second RRC signaling to the UAV, so that the UAV obtains the first flight path point number from the second RRC signaling.

In an embodiment, the second RRC signaling in the above (3-1) includes UEInformationRequest signaling, and the UEInformationRequest signaling includes a FlightPathInformationReq unit for bearing the first flight path point number. That is, the first flight path point number may be added to the FlightPathInformationReq unit of UEInformationRequest signaling, and then the UEInformationRequest signaling is sent to the UAV, so that the UAV may obtain the first flight path point number from the FlightPathInformationReq unit of the UEInformationRequest signaling.

In an embodiment, when the UAV determines the first path points information that needs to be reported in the flight path information according to the first flight path points at block 120, the detailed implementation may include followings if the flight path information includes the path points information corresponding to the first number of flight path points:

(4-1) if the first number is less than or equal to the first flight path point number, determining the path points information corresponding to the first number of flight path points as the first path points information;

(4-2) if the first number is greater than the first flight path point number, selecting the path points information corresponding to the first flight path point number from the path points information corresponding to the first number of flight path points and determining the selected path points information as the first path points information.

For example, if the first number is 6, and the first flight path point number is 10, the UAV determines the path points information corresponding to the 6 flight path points as the first path points information.

For another example, if the first number is 15, and the first flight path point number is 10, the UAV selects the path points information corresponding to 10 flight path points from the paths point information corresponding to the 15 flight path points, and determines the selected path points information as the first path points information.

At block 130, the first path points information sent by the UAV is received.

In an embodiment, the number of flight path points included in the first path points information is less than or equal to the first flight path point number.

In an embodiment, block 130 may be implemented by a third RRC signaling, the detailed implementation of which includes:

(5-1) receiving the third RRC signaling sent by UAV, wherein the third RRC signaling includes the first path points information;

(5-2) sending the second RRC signaling to the UAV, so that the UAV obtains the first flight path point number from the second RRC signaling.

In an embodiment, the third RRC signaling in block (5-1) includes UEInformationResponse signaling, and the UEInformationResponse signaling includes a FlightPathInformationReport unit for bearing the first flight path points information. That is, after receiving the UEInformationResponse signaling, the base station may obtain the first path points information from the FlightPathInformationReport unit of the UEInformationResponse signaling.

In an example application scenario, as illustrated in FIG. 2, the application scenario includes a UAV and a base station. When determining that the UAV has flight path information, the base station may configure the first flight path point number for the UAV and send the first flight path point number to the UAV, in which the first flight path point number is used to represent the first upper limit of the number of flight path points that the base station allows the UAV to report. After receiving the first flight path point number, the UAV may determine the first path points information that needs to be reported in the flight path information according to the first flight path point number, and send the first path points information to the base station.

As can be seen from the above embodiments, when determining that the UAV has flight path information, the first flight path point number may be configured for the UAV and sent to the UAV, wherein the first flight path point number is used to represent the first upper limit of the number of flight path points that the base station allows the UAV to report, so that the UAV determines the first path points information that needs to be reported in the first flight path information, and sends the first path information to the base station, thus achieving reporting the path points information according to the configuration of the base station, improving the efficiency of reporting path points information by the UAV and saving the resource consumption of information transmission.

Figure 3:
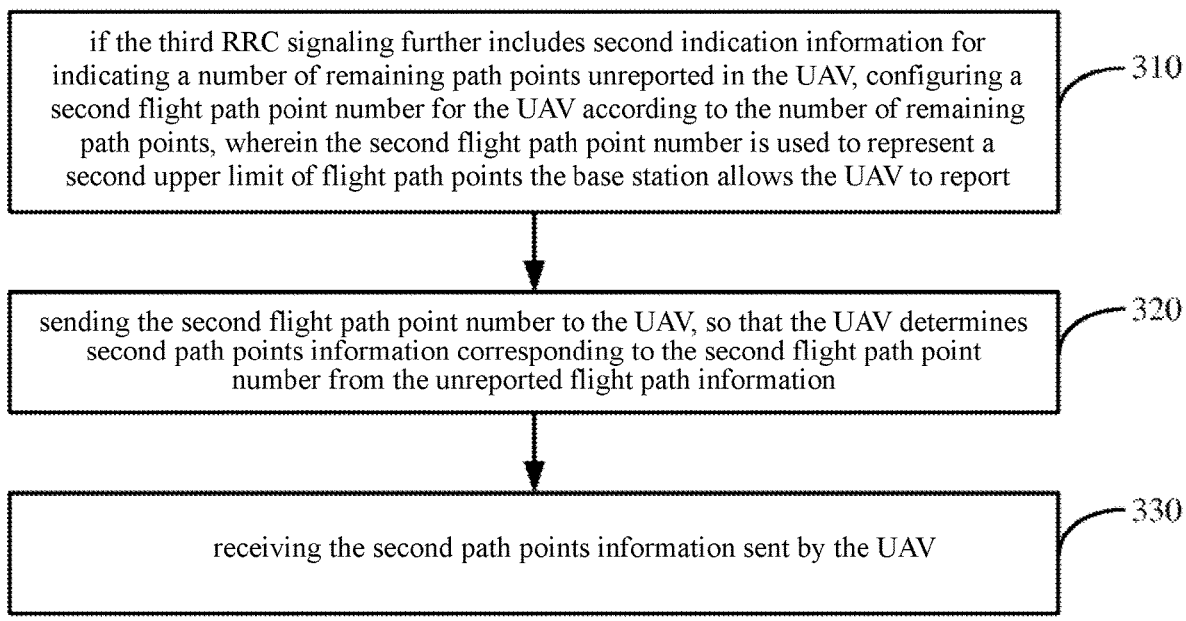
FIG. 3 is a flowchart illustrating another method for information transmission according to an example embodiment.

FIG. 3 is a flowchart illustrating another method for information transmission according to an example embodiment. The method for information transmission may be applied to a UAV. The method is established on the basis of the method as shown in FIG. 1. As illustrated in FIG. 3, the method for information transmission may include the following blocks 310-330:

At block 310, if the third RRC signaling includes second indication information for indicating a number of remaining path points not reported in the UAV, a second flight path point number is configured for the UAV according to the number of remaining path points. The second flight path point number is used to represent a second upper limit of the number of flight path points that the base station allows the UAV to report again.

In this embodiment, the second upper limit may refer to a maximum number of flight path points that the base station allows the UAV to report again. As the base station has obtained the number of remaining path points unreported in the UAV, the base station may configure the second flight path point number according to the number of remaining path points unreported in the UAV. The second flight path point number may be no less than the number of remaining path points. For example, if the number of remaining path points is 5, the second flight path point number is also 5.

For example, the flight path information of the UAV includes the path points information corresponding to 15 flight path points, the first flight path point number configured by the base station is 10, the path points information corresponding to 10 flight path points may be reported by the UAV, and the path points information corresponding to the remaining 5 flight path points is not reported. To obtain the unreported path points information, the base station may configure the second flight path point number as 5 or greater than 5, so that the path points information corresponding to the remaining 5 path points may be reported again by the UAV.

At block 320, the second flight path point number is sent to the UAV, so that the UAV determines second path points information corresponding to the second flight path point number from the unreported flight path information.

In an embodiment of the present disclosure, the implementation of block 320 may be the same with the implementation of block 120. That is, block 320 may be implemented through the second RRC signaling.

At block 330, the second path points information sent by the UAV is received.

In an embodiment of the present disclosure, the implementation of block 330 may be the same with the implementation of block 130. That is, block 330 may be implemented through the third RRC signaling.

As can be seen from the above embodiments, if the second indication information is used to indicate the number of remaining path points not reported in the UAV, the second flight path point number may be configured for the UAV according to the number of remaining path points, and sent to the UAV, wherein the second flight path point number is used to represent the second upper limit of the number of flight path points that the base station allows the UAV to report again, so that the UAV determines the second path points information that needs to be reported from the unreported flight path information according to the second flight path point number, and sends the second path points information to the base station, thus achieving reporting the path points information corresponding to the remaining path points to the base station, and improving the accuracy of reporting path points information by the UAV.

Figure 4:
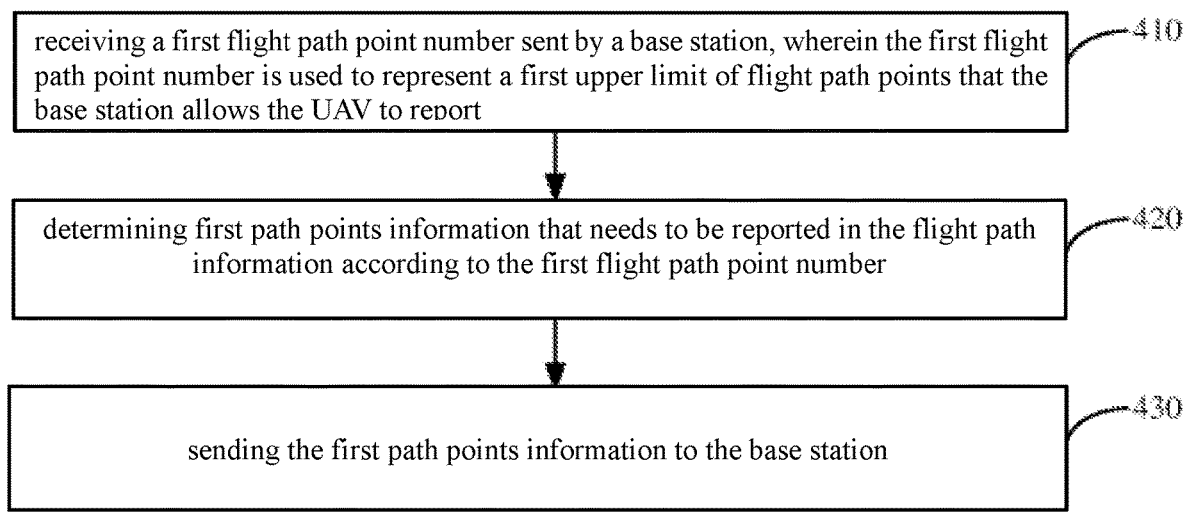
FIG. 4 is a flowchart illustrating a method for information transmission according to an example embodiment.

FIG. 4 is a flowchart illustrating a method for information transmission according to an example embodiment. This method for information transmission may be applied to a UAV having flight path information. As illustrated in FIG. 4, this method for information transmission may include the following blocks 410-430.

At block 410, a first flight path point number sent by a base station is received. The first flight path point number is used to represent a first upper limit of the number of flight path points that the base station allows the UAV to report.

In this embodiment, the first upper limit may refer to a maximum number of flight path points that the base station allows the UAV to report. As the base station is unaware of the number of flight path points included in the flight path information of the UAV, the base station may configure the first flight path point number according to the actual situation. For example, the first flight path point number is 15.

In an embodiment, before executing block 410, the following implementation may be adopted to inform the base station that the UAV has flight path information:

(6-1) generating first indication information, wherein the first indication information is used to indicate that the UAV has flight path information;

(6-2) sending the first indication information to the base station, so that the base station determines that the UAV has the flight path information according to the first indication information.

In an embodiment, block (6-2) may be implemented through a first RRC signaling, the detailed implementation of which includes:

(7-1) adding the first indication information to the first RRC signaling;

(7-2) sending the first RRC signaling to the base station, so that the base station obtains the first indication information from the first RRC signaling.

In an embodiment, when executing block (7-1), the first RRC signaling may include but not limited to, at least one of:

RRCConnectionReconfigurationComplete signaling;
RRCConnectionReestablishmentComplete signaling;
RRCConnectionResumeComplete signaling; and
RRCConnectionSetupComplete signaling.

In an embodiment, block 410 may be implemented through a second RRC signaling, the detailed implementation of which includes:

(8-1) receiving the second RRC signaling sent by the base station, wherein the second RRC signaling includes the first flight path point number;

(8-2) obtaining the first flight path point number from the second RRC signaling.

In an embodiment, the second RRC signaling in the above (8-1) includes UEInformationRequest signaling, and the UEInformationRequest signaling includes a FlightPathInformationReq unit for bearing the first flight path point number. That is, the first flight path point number may be added to the FlightPathInformationReq unit of the UEInformationRequest signaling, and then the UEInformationRequest signaling may be sent to the UAV, so that the UAV obtains the first flight path point number from the FlightPathInformationReq unit of the UEInformationRequest signaling.

At block 420, first path points information that needs to be reported in the flight path information is determined according to the first flight path point number.

At block 430, the first path points information is sent to the base station.

In this embodiment, the flight path information includes information corresponding to a first number of flight path points. When executing block 420 and block 430, the implementation way may be determined according to a size relationship between the first number and the first flight path point number.

Way 1: (1) if the first number is less than or equal to the first flight path point number, the path points information corresponding to the first number of flight path points is determined as the first path points information; (2) the first path points information is added to a third RRC signaling; (3) the third RRC signaling is sent to the base station, so that the base station obtains the first path points information from the third RRC signaling.

For example, if the first number is 6, and the first flight path point number is 10, the UAV determines the path points information corresponding to the 6 flight path points as the first path points information.

Way 2: (1) if the first number is greater than the first flight path point number, the path points information corresponding to the first flight path point number is selected from the path points information corresponding to the first number of flight path points and determined as the first path points information; (2) second indication information is generated, wherein the second indication information is used to indicate the number of remaining path points unreported in the UAV; (3) the first path points information and the second indication information are added to the third RRC signaling; (4) the third RRC signaling is sent to the base station, so that the base station obtains the first path points information and the second indication information from the third RRC signaling.

For example, if the first number is 15, and the first flight path point number is 10, the UAV selects the path points information corresponding to 10 flight path points from the path points information corresponding to the 15 flight path points, and determines the selected path points information as the first path points information. Moreover, since the path points information corresponding to the remaining 5 flight path points is not reported, the UAV may inform the base station through the second indication information that the path points information corresponding to the remaining 5 flight path points is not reported, in which the second indication information is used to indicate that the number of flight path points unreported in the UAV is 5.

In an embodiment, the third RRC signaling in the above Way 1 and Way 2 may include UEInformationResponse signaling, and the UEInformationResponse signaling includes a FlightPathInformationReport unit for bearing the first path points information. That is, after receiving the UEInformationResponse signaling, the base station may obtain the first path points information from the FlightPathInformationReport unit of the UEInformationResponse signaling.

As can be seen from the above embodiments, when receiving the first flight path point number sent by the base station, the first flight path point number being used to represent the first upper limit of the number of flight path points that the base station allows the UAV to report, the first path points information that needs to be reported in the flight path information may be determined according to the first flight path point number, and sent to the base station, thus achieving reporting the path points information according to the configuration of the base station, improving the efficiency of reporting path points information by the UAV and saving resource consumption of information transmission.

Figure 5:
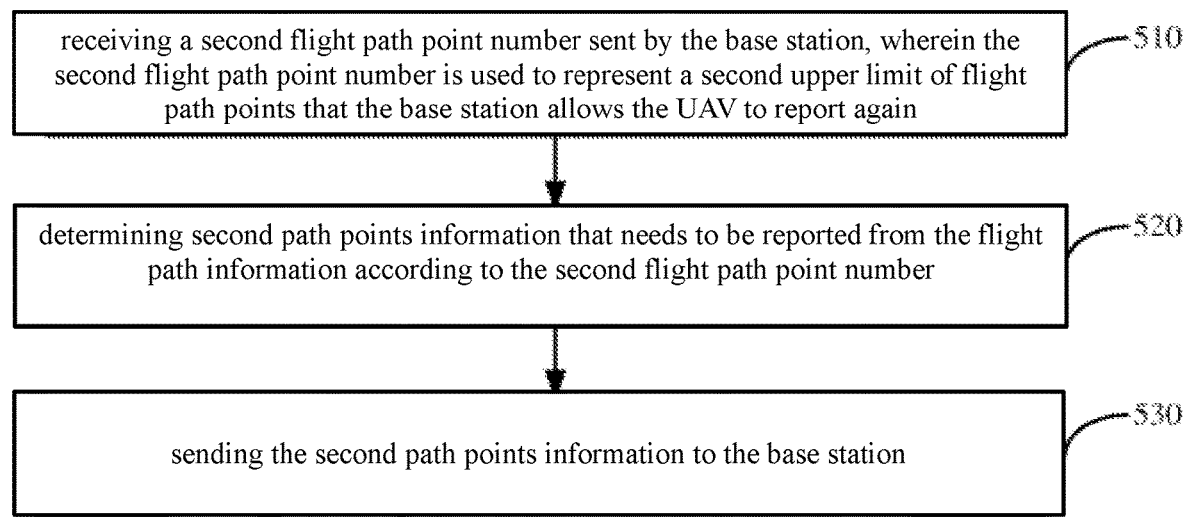
FIG. 5 is a flowchart illustrating another method for information transmission according to an example embodiment.

FIG. 5 is a flowchart illustrating a method for information transmission according to an example embodiment. This method for information transmission may be applied to the UAV having flight path information, and established on the basis of Way 2 as shown in FIG. 4. As illustrated in FIG. 5, this method for information transmission may include the following blocks 510-530.

At block 510, a second flight path point number sent by the base station is received. The second flight path point number is used to represent a second upper limit of the number of flight path points that the base station allows the UAV to report again.

In this embodiment, the second upper limit may refer to a maximum number of flight path points that the base station allows the UAV to report again. As the base station has obtained the number of remaining path points unreported in the UAV, the base station may configure the second flight path point number according to the number of remaining path points unreported in the UAV. For example, the second flight path point number may be greater than or equal to the number of the remaining path points. For example, if the number of remaining path points is 5, the second path point number is also 5.

At block 520, second path points information that needs to be reported is determined from the unreported flight path information according to the second flight path point number.

In an embodiment of the present disclosure, the implementation way adopted when executing block 520 can be the same with the implementation way adopted when executing block 420. That is, block 520 may be implemented through the second RRC signaling.

At block 530, the second path points information is sent to the base station.

In an embodiment of the present disclosure, the implementation way adopted when executing block 530 may be the same with the implementation way adopted when executing block 430. That is, block 530 may be implemented through the third RRC signaling.

As can be seen from the above embodiments, when receiving the second flight path point number sent by the base station, in which the second flight path point number is used to represent the second upper limit of the number of flight path points that the base station allows the UAV to report again, the second path points information that needs to be reported may be determined from the unreported flight path information according to the second flight path point number, and sent to the base station, thus achieving reporting the path points information corresponding to the remaining path points to the base station, and improving the accuracy of the UAV reporting the path points information.

The present disclosure further provides embodiments of an apparatus for information transmission corresponding to the aforementioned embodiments of the method for information transmission.

Figure 6:
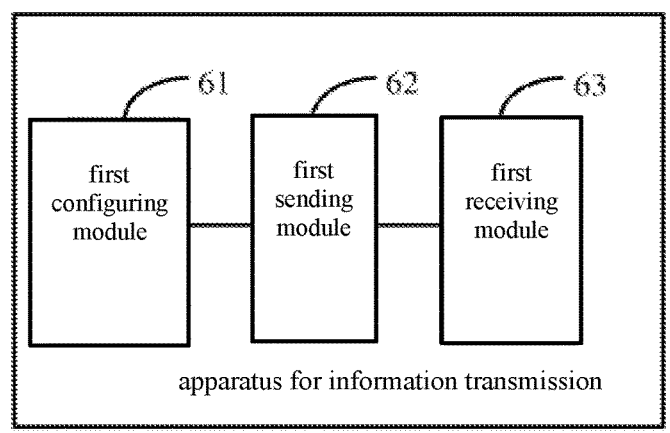
FIG. 6 is a block diagram illustrating an apparatus for information transmission according to an example embodiment.

FIG. 6 is a block diagram illustrating an apparatus for information transmission according to an example embodiment. The apparatus is applied to a base station, and is configured to implement the method for information transmission as illustrated n in FIG. 1. As illustrated in FIG. 6, the apparatus for information transmission may include a first configuring module 61, a first sending module 62 and a first receiving module 63.

The first configuration module 61 is configured to, when determining that the UAV has flight path information, configure a first flight path point number for the UAV, in which the first flight path point number is used to represent a first upper limit of the number of flight path points that the base station allows the UAV to report.

The first sending module 62 is configured to send the first flight path point number to the UAV, so that the UAV determines first path points information that needs to be reported in the flight path information according to the first flight path point number.

The first receiving module 63 is configured to receive the first path points information sent by the UAV.

As can be seen from the above embodiments, when determining that the UAV has flight path information, the first flight path point number may be configured for the UAV and sent to the UAV, in which the first flight path point number is used to represent the first upper limit of the number of flight path points that the base station allows the UAV to report, so that the UAV determines the first path points information that needs to be reported in the flight path information according to the first flight path point number and sends the first path points to the base station, thus achieving reporting the path points information according to the configuration of the base station, improving the efficiency of reporting path points information by the UAV, and saving resource consumption of information transmission.

Figure 7:
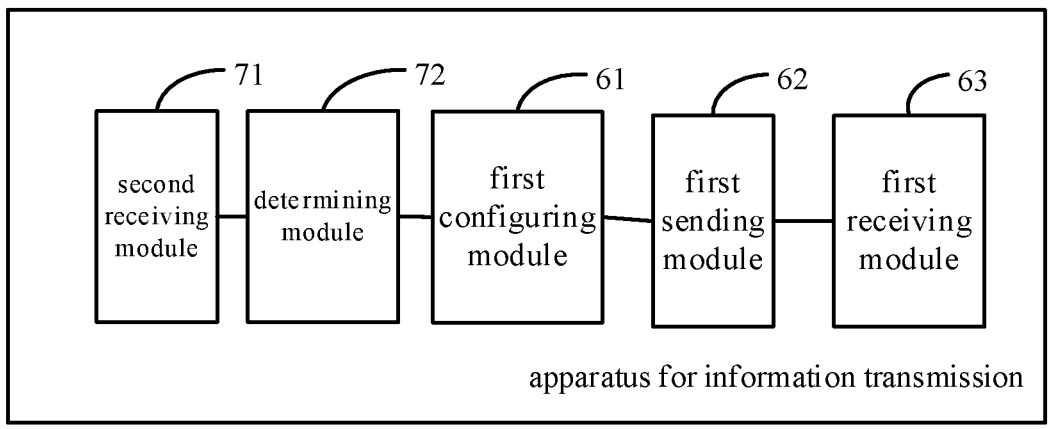
FIG. 7 is a block diagram illustrating another apparatus for information transmission according to an example embodiment.

In an embodiment, on the basis of the apparatus as shown in FIG. 6, as illustrated in FIG. 7, the apparatus further includes a second receiving module 71 and a determining module 72.

The second receiving module 71 is configured to receive first indication information sent by the UAV, in which the first indication information is used to indicate that the UAV has flight path information.

The determining module 72 is configured to determine that the UAV has flight path information according to the first indication information.

Figure 8:
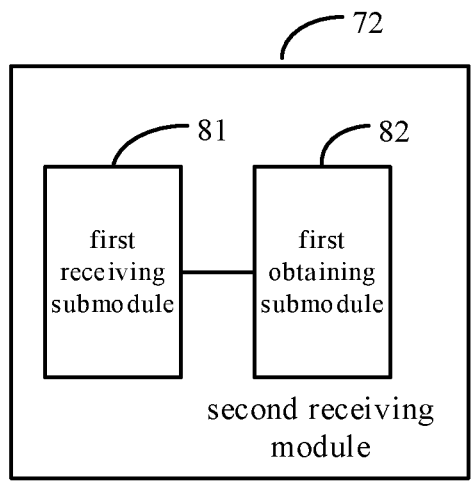
FIG. 8 is a block diagram illustrating another apparatus for information transmission according to an example embodiment.

In an embodiment, on the basis of the apparatus as shown in FIG. 7, as illustrated in FIG. 8, the second receiving module 72 may include a first receiving submodule 81 and a first obtaining submodule 82.

The first receiving submodule 81 is configured to receive a first RRC signaling sent by the UAV, in which the first RRC signaling includes the path indication information.

The first obtaining submodule 82 is configured to obtain the path indication information from the first RRC signaling.

In an embodiment, on the basis of the apparatus as shown in FIG. 8, the first RRC signaling may include but not limited to at least one of:
RRCConnectionReconfigurationComplete signaling;
RRCConnectionReestablishmentComplete signaling;
RRCConnectionResumeComplete signaling; and
RRCConnectionSetupComplete signaling.

Figure 9:
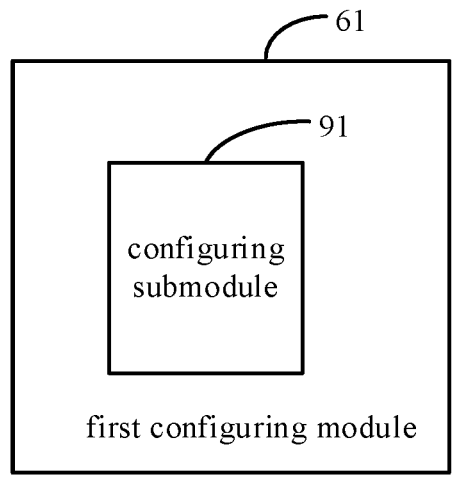
FIG. 9 is a block diagram illustrating another apparatus for information transmission according to an example embodiment.

In an embodiment, on the basis of the apparatus as shown in FIG. 6, as illustrated in FIG. 9, the first configuring module 61 may include a configuration submodule 91.

The configuring submodule 91 is configured to determine the first flight path point number according to a memory size of the base station.

Figure 10:
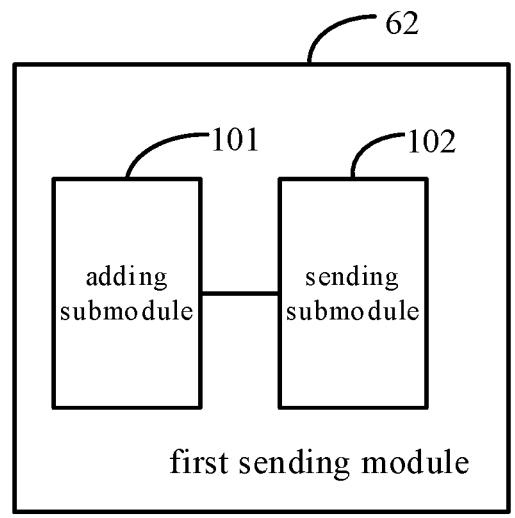
FIG. 10 is a block diagram illustrating another apparatus for information transmission according to an example embodiment.

In an embodiment, on the basis of the apparatus as shown in FIG. 6, as illustrated in FIG. 10, the first sending module 62 may include an adding submodule 101, and a sending submodule 102.

The adding submodule 101 is configured to add the first flight path point number to a second RRC signaling.

The sending submodule 102 is configured to send the second RRC signaling to the UAV, so that the UAV obtains the first flight path point number from the second RRC signaling.

In an embodiment, on the basis of the apparatus as illustrated in FIG. 10, the second RRC signaling includes UEInformationRequest signaling, and the UEInformationRequest signaling includes a FlightPathInformationReq unit for bearing the first flight path point number.

Figure 11:
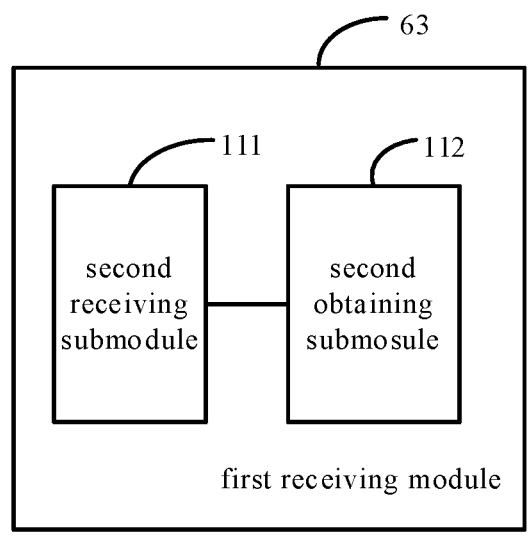
FIG. 11 is a block diagram illustrating another apparatus for information transmission according to an example embodiment.

In an embodiment, on the basis of the apparatus as shown in FIG. 6, as illustrated in FIG. 11, the first receiving module 63 may include a second receiving submodule 111, and a second obtaining submodule 112.

The second receiving submodule 111 is configured to receive a third RRC signaling sent by UAV, wherein the third RRC signaling includes the first path points information.

The second obtaining submodule 112 is configured as obtaining the first path points information from the third RRC signaling.

In an embodiment, on the basis of the apparatus as shown in FIG. 11, the third RRC signaling includes UEInformationResponse signaling, and the UEInformationResponse signaling includes a FlightPathInformationReport unit for bearing the first path points information.

Figure 12:
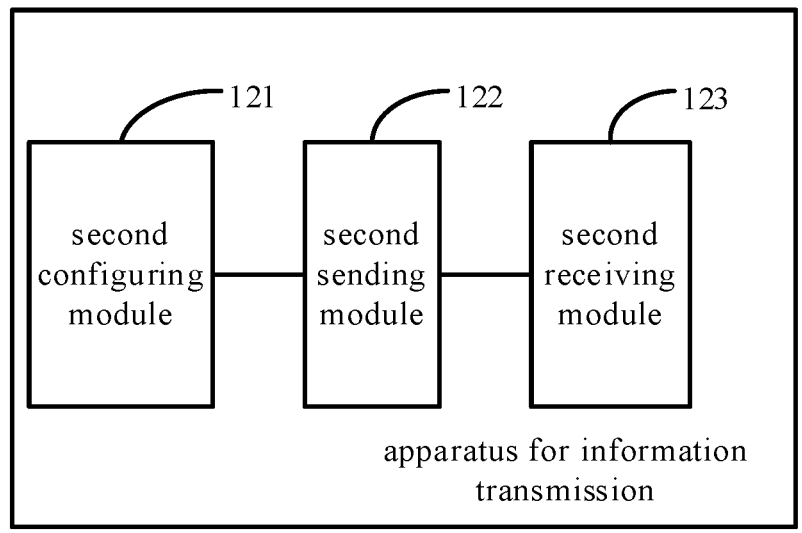
FIG. 12 is a block diagram illustrating another apparatus for information transmission according to an example embodiment.

In an embodiment, on the basis of the apparatus as shown in FIG. 6, as illustrated in FIG. 12, the apparatus may further include a second configuring module 121, a third sending module 122 and a second receiving module 123.

The second configuring module 121 is configured to, when the third RRC signaling further includes second indication information used to indicate a number of remaining path points unreported in the UAV, configure a second flight path point number for the UAV according to the number of remaining path points. The second flight path point number is used to represent a second upper limit of the number of flight path points that the base station allows the UAV to report again.

The third sending module 122 is configured to send the second flight path point number to the UAV, so that the UAV determines second path points information corresponding to the second flight path point number from the unreported flight path information.

The second receiving module 123 is configured to receive the second path points information sent by the UAV.

As can be seen from the above embodiments, if the second indication information is used to indicate the number of remaining path points not reported in the UAV, the second flight path point number may be configured for the UAV according to the number of remaining path points, and sent to the UAV, in which the second flight path point number is used to represent the second upper limit of the number of flight path points that the base station allows the UAV to report again, so that it is convenient for the UAV to determine the second path points information that needs to be reported from the unreported flight path information according to the second flight path point number and send the second path points information to the base station, thus achieving reporting the path points information corresponding to the remaining path points to the base station, and improving the accuracy of the UAV reporting the path points information.

Figure 13:
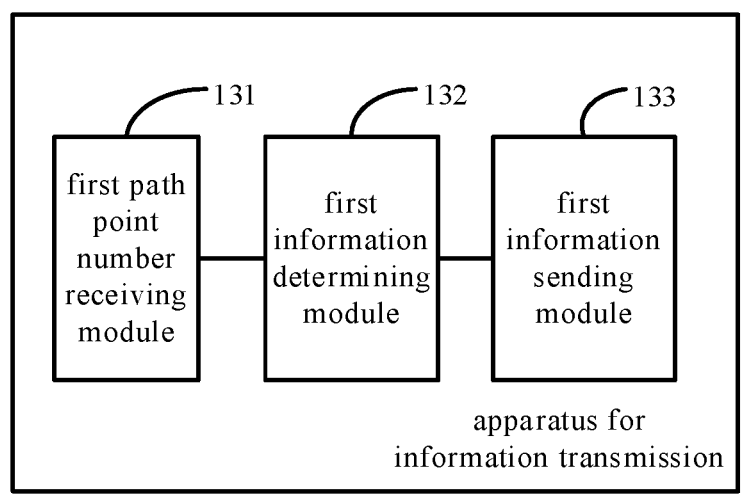
FIG. 13 is a block diagram illustrating an apparatus for information transmission according to an example embodiment.

FIG. 13 is a block diagram illustrating an apparatus for information transmission according to an example embodiment. This apparatus for information transmission is applied to the UAV having flight path information and is configured to implement the method for information transmission as shown in FIG. 4. As illustrated in FIG. 13, this apparatus for information transmission may include a first path point number receiving module 131, a first information determining module 132, and a first information sending module 133.

The first path point number receiving module 131 is configured to receive a first flight path point number sent by the base station, in which the first flight path point number is used to represent a first upper limit of the number of flight path points that the base station allows the UAV to report.

The first information determining module 132 is configured to determine first path points information that needs to be reported in the flight path information according to the first flight path point number.

The first information sending module 133 is configured to send the first path points information to the base station.

As can be seen from the above embodiments, when receiving the first flight path point number sent by the base station, in which the first flight path point number is used to represent the first upper limit of the number of flight path points that the base station allows the UAV to report, the first path points information that needs to be reported in the flight path information may be determined according to the first flight path point number and sent to the base station, thus achieving reporting path points information according to the configuration of the base station, improving the efficiency of reporting path points information by the UAV, and saving resource consumption of information transmission.

Figure 14:
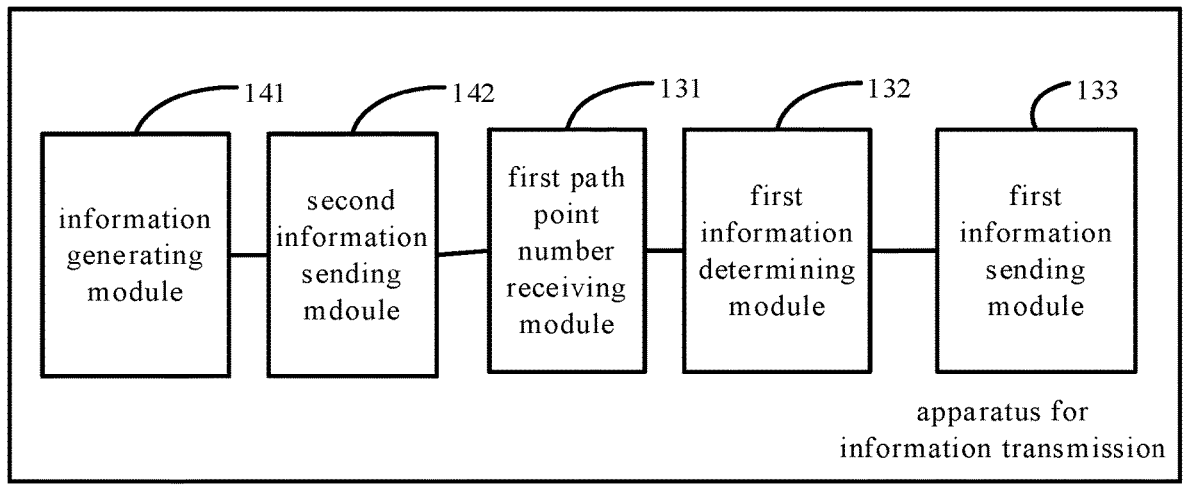
FIG. 14 is a block diagram illustrating another apparatus for information transmission according to an example embodiment.

In an embodiment, on the basis of the apparatus as shown in FIG. 13, as illustrated in FIG. 14, the apparatus may further include an information generating module 141 and a second information sending module 142.

The information generating module 141 is configured to generate first indication information, wherein the first indication information is used to indicate that the UAV has flight path information.

The second information sending module 142 is configured to send the first indication information to the base station, so that the base station determines that the UAV has flight path information according to the first indication information.

Figure 15:
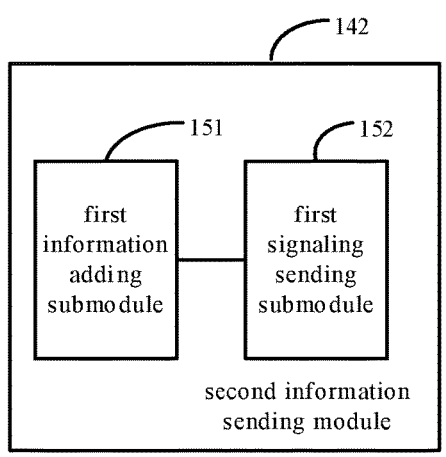
FIG. 15 is a block diagram illustrating another apparatus for information transmission according to an example embodiment.

In an embodiment, on the basis of the apparatus as shown in FIG. 14, as illustrated in FIG. 15, the second information sending module 142 may include a first information adding submodule 151 and a first signaling sending submodule 152.

The first information adding submodule 151 is configured to add the first indication information to a first RRC signaling.

The first signaling sending submodule 152 is configured to send the first RRC signaling to the base station, so that the base station obtains the first indication information from the first RRC signaling.

In an embodiment, on the basis of the apparatus as shown in FIG. 15, the first RRC signaling may include but not limited to at least one of:
RRCConnectionReconfigurationComplete signaling;
RRCConnectionReestablishmentComplete signaling;
RRCConnectionResumeComplete signaling; and
RRCConnectionSetupComplete signaling.

Figure 16:
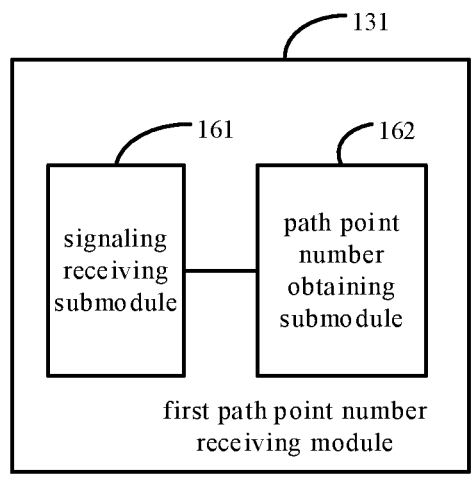
FIG. 16 is a block diagram illustrating another apparatus for information transmission according to an example embodiment.

In an embodiment, on the basis of the apparatus as shown in FIG. 13, as illustrated in FIG. 16, the first path point number receiving module 131 may include a signaling receiving submodule 161 and a path point number receiving submodule 162.

The signaling receiving submodule 161 is configured to receive a second RRC signaling sent by the base station, wherein the second RRC signaling includes the first flight path point number.

The path point number obtaining submodule 162 is configured to obtain the first flight path point number from the second RRC signaling.

In an embodiment, on the basis of the apparatus as shown in FIG. 16, the second RRC signaling may include UEInformationRequest signaling, and the UEInformationRequest signaling includes a FlightPathInformationReq unit for bearing the first flight path point number.

Figure 17:
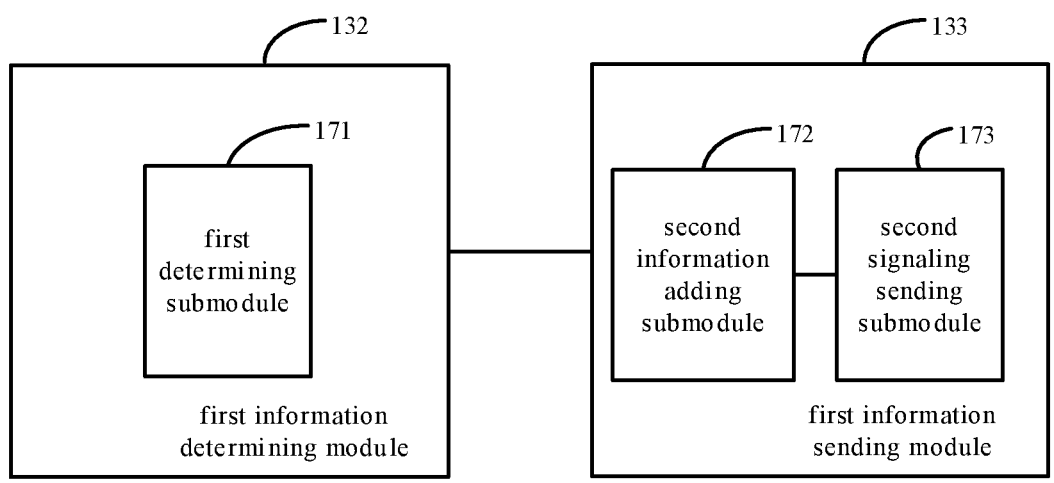
FIG. 17 is a block diagram illustrating another apparatus for information transmission according to an example embodiment.

In an embodiment, on the basis of the apparatus as shown in FIG. 13, as illustrated in FIG. 17, the flight path information includes information corresponding to a first number of flight path points.

The first information determining module 132 may include a first determining submodule 171.

The first determining submodule 171 is configured to, if the first number is less than or equal to the first flight path point number, determine path points information corresponding to the first number of flight path points as the first path points information.

The first information sending module 133 may include a second information adding submodule 172 and a second signaling sending submodule 173.

The second information adding submodule 172 is configured to add the first path points information to a third RRC signaling.

The second signaling sending submodule 173 is configured to send the third RRC signaling to the base station, so that the base station obtains the first path points information from the third RRC signaling.

Figure 18:
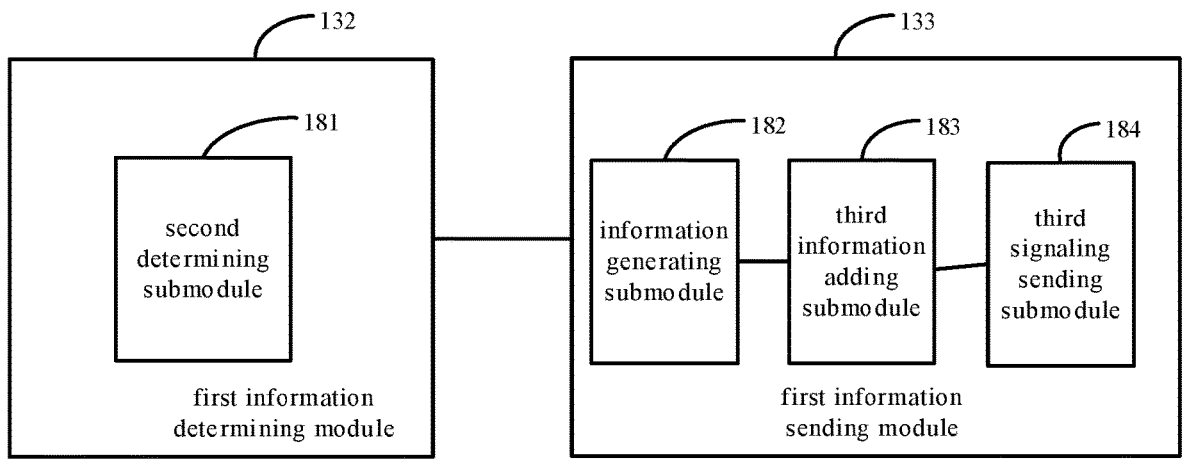
FIG. 18 is a block diagram illustrating another apparatus for information transmission according to an example embodiment.

In an embodiment, on the basis of the apparatus as shown in FIG. 13, as illustrated in FIG. 18, the flight path information includes the information corresponding to the first number of flight path points.

The first information determining module 132 may include a second determining submodule 181.

The second determining submodule 181 is configured to, if the first number is greater than the first flight path point number, select path points information corresponding to the first flight path point number from the path points information corresponding to the first number of flight path points and determine the selected path points information as the first path points information.

The first information sending module 133 may include an information generating submodule 182, a third information adding submodule 183 and a third signaling sending submodule 184.

The information generating submodule 182 is configured to generate second indication information, wherein the second indication information is used to indicate a number of remaining path points unreported in the UAV.

The third information adding submodule 183 is configured to add the first path points information and the second indication information to the third RRC signaling.

The third signaling sending submodule 184 is configured to send the third RRC signaling to the base station, so that the base station obtains the first path points information and the second indication information from the third RRC signaling.

In an embodiment, on the basis of the apparatus as shown in FIG. 17 or FIG. 18, the third RRC signaling includes UEInformationResponse signaling, and the UEInformationResponse signaling includes a FlightPathInformationReport unit for bearing the first path points information.

Figure 19:
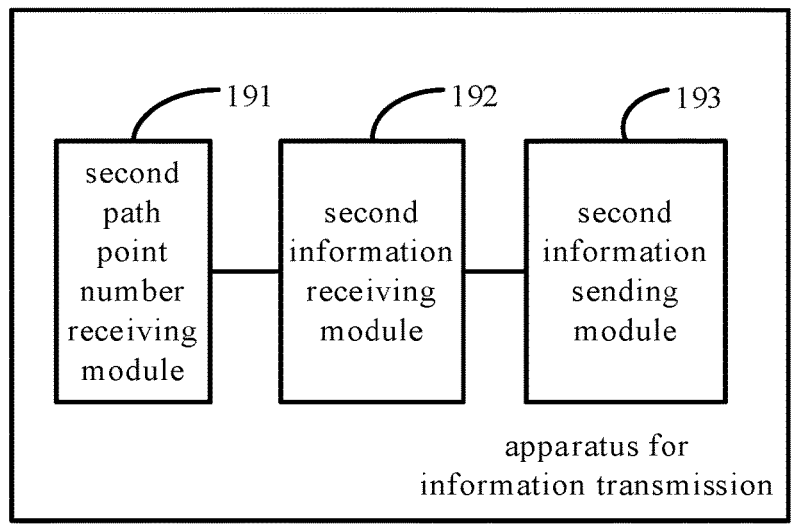
FIG. 19 is a block diagram illustrating another apparatus for information transmission according to an example embodiment.

In an embodiment, on the basis of the apparatus as shown in FIG. 13, as illustrated in FIG. 19, the apparatus may further include a second path point number receiving module 191, a second information determining module 192 and a third information sending module 193.

The second path point number receiving module 191 is configured to receive a second flight path point number sent by the base station, wherein the second flight path point number is used to represent a second upper limit of the number of flight path points that the base station allows the UAV to report again.

The second information determining module 192 is configured to determine second path points information that needs to be reported from the flight path information according to the second flight path point number.

The third information sending module 193 is configured to send the second path points information to the base station.

As can be seen from the above embodiments, when receiving the second flight path point number sent by the base station, in which the second flight path point number is used to represent the second upper limit of the number of flight path points that the base station allows the UAV to report again, the second path points information that needs to be reported may be determined from the flight path information according to the second flight path point number, and sent to the base station, thus achieving reporting the path points information corresponding to the remaining path points to the base station, and improving the accuracy of reporting path points information by the UAV.

The apparatus methods are substantially corresponding to method embodiments, and thus for relevant parts, reference may be made to the partial description of method embodiments. The apparatus embodiments described above are only illustrative. The above units described as separate parts may or may not be physically separated, the parts shown as units may or may not be physical units, which may be located in one place, or may be distributed to multiple network units. Part or all of modules can be selected according to the actual requirements to achieve the purpose of this disclosure. Ordinary technicians in this field can understand and implement them without any creative effort.

Accordingly, the present disclosure further provides a non-temporary computer readable storage medium. The storage medium is stored thereon with a computer program. The computer program is configured to implement the method for information transmission described in any of FIGS. 1-3.

Accordingly, the present disclosure further provides a non-temporary computer readable storage medium. The storage medium is stored thereon with a computer program. The computer program is configured to implement the method for information transmission described in any of FIGS. 4-5.

Accordingly, the present disclosure further provides an apparatus for information transmission. The apparatus is applied to a base station, and includes:

a processor;

a memory configured to store instructions executable by the processor, wherein, the processor is configured to:

when determining that a UAV has flight path information, configure a first flight path point number for the UAV, wherein the first flight path point number is used to represent a first upper limit of the number of flight path points that the base station allows the UAV to report;

send the first flight path point number to the UAV, so that the UAV determines the first path points information corresponding to the first flight path point number from the flight path information;

receive the first path points information sent by the UAV.

Figure 20:
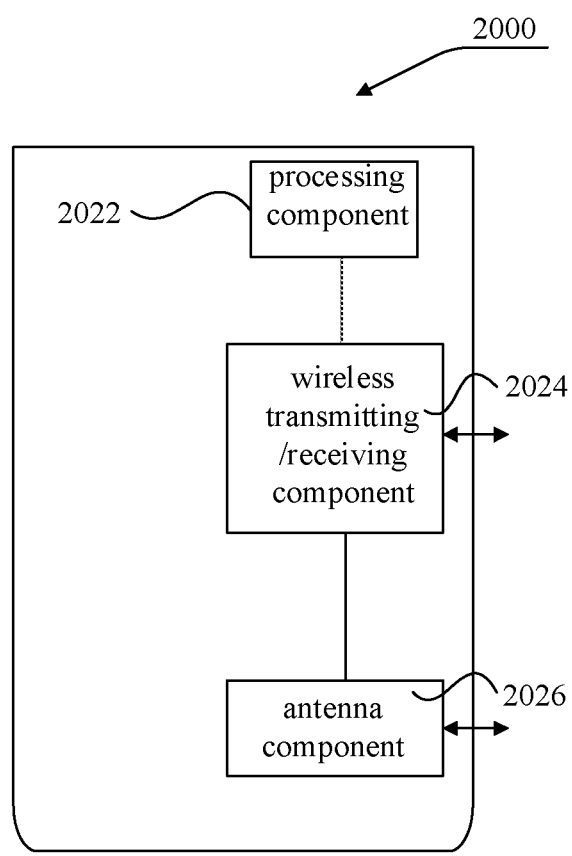
FIG. 20 is a block diagram illustrating an apparatus for information transmission according to an example embodiment.

As illustrated in FIG. 20, which is a block diagram illustrating an apparatus for information transmission according to an example embodiment, the apparatus 2000 may be provided as a base station. Referring to FIG. 20, the apparatus 2000 includes a processing component 2022, a wireless transmitting/receiving component 2024, an antenna component 2026 and a signal processing part specific to a wireless interface. The processing component 2022 may further include one or more processors.

One processor of the processing component 2022 may be configured to implement any of the above methods for information transmission.

The present disclosure further provides an apparatus for information transmission. The apparatus is applied to a UAV having flight path information, and includes:
  a processor;
  a memory configured to store instructions executable by the processor;
  wherein, the processor is configured to:
  receive a first flight path point number sent by a base station, wherein the first flight path point number is used to represent a first upper limit of the number of flight path points that the base station allows the UAV to report;
  determine first path points information corresponding to the first flight path point number from the flight path information;
  send the first path points information to the base station.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present application is not limited to the precise structure described above and shown in the drawings, and various modifications and changes may be made without departing from its scope. The scope of the present application is only limited by the appended claims.

What is claimed is:

1. A method for information transmission, performed by a base station, comprising:
  when determining that an unmanned aerial vehicle (UAV) has flight path information, configuring a first flight path point number for the UAV, wherein the first flight path point number is used to represent a first upper limit of the number of flight path points that the base station allows the UAV to report;
  sending the first flight path point number to the UAV, so that the UAV determines first path points information that needs to be reported in the flight path information according to the first flight path point number;
  receiving the first path points information sent by the UAV;
  wherein the sending the first flight path point number to the UAV comprises:
  adding the first flight path point number to a second RRC signaling; and
  sending the second RRC signaling to the UAV, such that the UAV obtains the first flight path point number from the second RRC signaling.

2. The method of claim 1, further comprising:
  receiving first indication information sent by the UAV, wherein the first indication information is used to indicate that the UAV has the flight path information;
  determining that the UAV has the flight path information according to the first indication information.

3. The method of claim 2, wherein the receiving the path indication information sent by the UAV comprises:
  receiving a first radio resource control (RRC) signaling sent by the UAV, wherein the first RRC signaling includes the path indication information;
  obtaining the path indication information from the first RRC signaling.

4. The method of claim 3, wherein the first RRC signaling comprises at least one of:
  RRCConnectionReconfigurationComplete signaling;
  RRCConnectionReestablishmentComplete signaling;
  RRCConnectionResumeComplete signaling; and
  RRCConnectionSetupComplete signaling.

5. The method of claim 1, wherein the configuring the first flight path point number for the UAV comprises:
  determining the first flight path point number according to a memory size of the base station.

6. The method of claim 1, wherein the second RRC signaling comprises a UEInformationRequest signaling, and the UE Information Request signaling comprises a FlightPathInformationReq unit for bearing the first flight path point number.

7. The method of claim 1, wherein the receiving the first path points information sent by the UAV comprises:
  receiving a third RRC signaling sent by UAV, wherein the third RRC signaling comprises the first path points information;
  obtaining the first path points information from the third RRC signaling.

8. The method of claim 7, wherein the third RRC signaling comprises UEInformationResponse signaling, and the UEInformationResponse signaling comprise a FlightPathInformationReport unit for bearing the first flight path points information.

9. The method of claim 7, further comprising:
  when the third RRC signaling further comprises second indication information used to indicate a number of remaining path points unreported in the UAV, configuring a second flight path point number for the UAV according to the number of remaining path points, wherein the second flight path point number is used to represent a second upper limit of the number of flight path points that the base station allows the UAV to report again;
  sending the second flight path point number to the UAV, so that the UAV determines second path points information corresponding to the second flight path point number from unreported flight path information;
  receiving the second path points information sent by the UAV.

10. A method for information transmission, performed by an unmanned aerial vehicle (UAV) having flight path information, comprising:
  receiving a first flight path point number sent by a base station, wherein the first flight path point number is used to represent a first upper limit of the number of flight path points that the base station allows the UAV to report;
  determining first path points information that needs to be reported in the flight path information according to the first flight path point number;
  sending the first path points information to the base station;
  wherein the receiving the first flight path point number sent by the UAV comprises:
  receiving a second RRC signaling sent by the base station, wherein the second RRC signaling comprises the first flight path point number; and obtaining the first flight path point number from the second RRC signaling.

11. The method of claim 10, further comprising:
generating first indication information, wherein the first indication information is used to indicate that the UAV has the flight path information;
sending the first indication information to the base station, so that the base station determines that the UAV has the flight path information according to the first indication information.

12. The method of claim 11, wherein the sending the first indication information to the base station comprises:
adding the first indication information to a first radio resource control (RRC) signaling;
sending the first RRC signaling to the base station, so that the base station obtains the first indication information from the first RRC signaling.

13. The method of claim 12, wherein the first RRC signaling comprises at least one of:
RRCConnectionReconfigurationComplete signaling;
RRCConnectionReestablishmentComplete signaling;
RRCConnectionResumeComplete signaling; and
RRCConnectionSetupComplete signaling.

14. The method of claim 10, wherein the second RRC signaling comprises UEInformationRequest signaling, and the UEInformationRequest signaling comprises a FlightPathInformationReq unit for bearing the first flight path point number.

15. The method of claim 10, wherein the flight path information comprises information corresponding to a first number of flight path points;
determining the first path points information that needs to be reported in the flight path information according to the first flight path point number comprises:
in a case that the first number is less than or equal to the first flight path point number, determining the path points information corresponding to the first number of flight path points as the first path points information;
sending the first path points information to the base station comprises:
adding the first path points information to a third RRC signaling;
sending the third RRC signaling to the base station, so that the base station obtains the first path points information from the third RRC signaling.

16. The method of claim 15, wherein the third RRC signaling comprises UEInformationResponse signaling, and the UEInformationResponse signaling comprises a FlightPathInformationReport unit for bearing the first path points information.

17. The method of claim 10, wherein the flight path information comprises path points information corresponding to a first number of flight path points;
the determining the first path points information corresponding to the first flight path point number from the flight path information comprises:
in a case that the first number is greater than the first flight path point number, selecting path points information corresponding to the first flight path point number from path points information corresponding to the first number of flight path points and determining selected paths point information as the first path points information;
the sending the first path points information to the base station comprises:
generating second indication information, wherein the second indication information is used to indicate a number of remaining path points unreported in the UAV;
adding the first path points information and the second indication information to a third RRC signaling;
sending the third RRC signaling to the base station, so that the base station obtains the first path points information and the second indication information from the third RRC signaling.

18. The method of claim 17, further comprising:
receiving a second flight path point number sent by the base station, wherein the second flight path point number is used to represent a second upper limit of the number of flight path points that the base station allows the UAV to report again;
determining second path points information that needs to be reported from unreported flight path information according to the second flight path point number; and
sending the second path points information to the base station.

19. An apparatus for information transmission implementing the method of claim 10, comprising:
a processor;
memory configured to store instructions executable by the processor;
wherein, the processor is configured to perform steps of the method.

20. An apparatus for information transmission, applied to a base station, comprising:
a processor;
memory configured to store instructions executable by the processor;
wherein the processor is configured to:
when determining that an unmanned aerial vehicle (UAV) has flight path information, configure a first flight path point number for the UAV, wherein the first flight path point number is used to represent a first upper limit of the number of flight path points that the base station allows the UAV to report;
send the first flight path point number to the UAV, so that the UAV determines the first path points information corresponding to the first flight path point number from the flight path information;
receive the first path points information sent by the UAV;
wherein the processor is further configured to send the first flight path point number to the UAV by:
adding the first flight path point number to a second RRC signaling; and
sending the second RRC signaling to the UAV, so that the UAV obtains the first flight path point number from the second RRC signaling.

* * * * *